P. Crans Jr.

Dental Pin.

Nº 104,835. Patented Jun. 28. 1870.

Witnesses
Hermann Spaerke
H. H. Hyneman

Inventor
Peter Crans Jr.

United States Patent Office.

PETER CRANS, JR., (ROBERT McKINLEY, ADMINISTRATOR,) OF PHILADELPHIA, PENNSYLVANIA.

*Letters Patent No. 104,835, dated June 28, 1870.*

IMPROVEMENT IN DENTAL PINS.

The Schedule referred to in these Letters Patent and making part of the same.

*To all whom it may concern:*

Be it known that I, PETER CRANS, Jr., of the city and county of Philadelphia, State of Pennsylvania, have invented a new and useful Improvement in the Manufacture of Dentists' Pins; and I do hereby declare that the following is a full and exact description thereof, reference being had to the accompanying drawing making part of this specification, in which—

The object of my invention is to dispense with the two-headed pins, with the pins cut out of platinum plate, the pins made of two round wires twisted together, and with the other devices which are now in use for securing artificial teeth to the base or plate, and to substitute for them pins made of a single wire, either flattened or provided with one or more edges or longitudinal grooves, and afterward twisted and cut into suitable pieces.

Experience has shown me this to be the cheapest, and, at the same time, the best mode of effecting the desired purpose.

To enable others skilled in the art to make and use my invention, I will proceed to describe its construction and operation.

Figure 1:
Figure 1 is a view of a wire, provided with several grooves, from which my pins are made.
Figure 2:
Figure 2 is a view of the same wire, after being twisted.
Figure 3:
Figure 3 is a section of the same.
Figure 4:
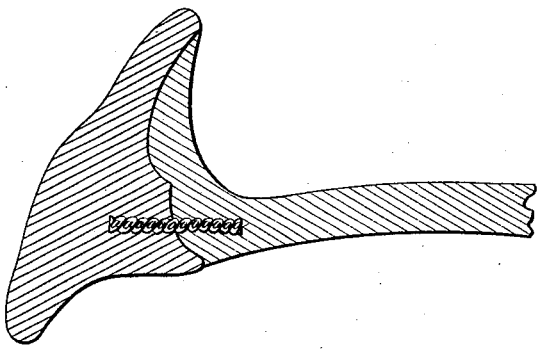
Figure 4 shows the mode of fastening artificial teeth to the plate by means of my improved pins.

Platinum wire is drawn through suitable machinery, for the purpose of either forming one or more longitudinal grooves $a\ a\ a\ a$, figs. 1, 2, and 3, or to flatten it, or to press it in a square, triangular, or any other angular shape.

After this is done, the so prepared wire is twisted, in order to form a thread, as shown in fig. 2. It is then cut into pieces of suitable length, which I use as pins to secure artificial teeth to their bases.

For this purpose I place my pins in suitable apertures of the teeth-molds, and form the teeth over the pins, so that, when the baked teeth are taken from the molds, half of the pin is firmly imbedded in the tooth.

The projecting part of the pin is used to connect the tooth with the base in the usual way.

No claim is made to baking the pin in the teeth in process of manufacture, nor to the particular kind of screw by itself, as both are old; but

What I claim is—

The pin, formed by twisting a single wire of angular shape, so as to form threads, combined with artificial teeth in the manner described, for the purpose of connecting artificial teeth with a base.

PETER CRANS, JR.

Witnesses:
HERMANN SPOENKE,
H. U. HYNEMAN.